US010682976B2

(12) United States Patent
Rathgeb et al.

(10) Patent No.: US 10,682,976 B2
(45) Date of Patent: Jun. 16, 2020

(54) VEHICLE OCCUPANT RESTRAINT SYSTEM

(71) Applicant: TB Deu Abwicklungs-Aktiengesellschaft, Aschaffenburg (DE)

(72) Inventors: Volker Rathgeb, Ehingen-Risstissen (DE); Karl-Heinz Bührlen, Ulm (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 59 days.

(21) Appl. No.: 16/180,843

(22) Filed: Nov. 5, 2018

(65) Prior Publication Data
US 2019/0135221 A1 May 9, 2019

(30) Foreign Application Priority Data

Nov. 3, 2017 (DE) .................. 10 2017 125 755

(51) Int. Cl.
*B60R 21/231* (2011.01)
*B60R 21/207* (2006.01)
*B60R 21/233* (2006.01)

(52) U.S. Cl.
CPC .......... *B60R 21/231* (2013.01); *B60R 21/207* (2013.01); *B60R 21/23138* (2013.01); *B60R 2021/23146* (2013.01); *B60R 2021/23316* (2013.01)

(58) Field of Classification Search
CPC ............ B60R 21/231; B60R 21/23138; B60R 21/207; B60R 2021/23146; B60R 2021/23316
USPC ....................................... 280/730.1
See application file for complete search history.

(56) References Cited

U.S. PATENT DOCUMENTS

| 3,731,949 | A | | 5/1973 | Radke |
| 5,895,070 | A | * | 4/1999 | Lachat ................. B60R 21/207 |
| | | | | 280/729 |
| 7,828,322 | B2 | | 11/2010 | Breuninger et al. |
| 8,047,564 | B2 | * | 11/2011 | Kibat ................ B60R 21/23138 |
| | | | | 280/730.2 |

(Continued)

FOREIGN PATENT DOCUMENTS

| DE | 2222621 | 11/1972 |
| DE | 10 2005 059 197 B4 | 4/2008 |

(Continued)

OTHER PUBLICATIONS

Machine Translation of JP-10315891-A (Year: 1998).*

*Primary Examiner* — Paul N Dickson
*Assistant Examiner* — Kurtis Nielson
(74) *Attorney, Agent, or Firm* — Gordon Rees Scully Mansukhani, LLP

(57) ABSTRACT

It is provided a vehicle occupant restraint system comprising an airbag module and a vehicle seat, wherein the airbag module comprises an inflatable gas bag and the vehicle seat comprises a backrest with a front side, a rear side, a left side, a right side and an upper side. The gas bag is arranged at the backrest of the vehicle seat in such a way that in the inflated state the gas bag extends over a portion of the rear side of the backrest, over a portion of the left or the right side of the backrest and over a portion of the upper side of the backrest and is supported on the portion of the rear side of the backrest, on the portion of the left or the right side of the backrest and on the portion of the upper side of the backrest.

14 Claims, 2 Drawing Sheets

(56) References Cited

U.S. PATENT DOCUMENTS

| | | | |
|---|---|---|---|
| 8,985,625 B2* | 3/2015 | Gwon | B60R 21/2334 280/743.1 |
| 2007/0057493 A1* | 3/2007 | Ritzel | B60N 2/58 280/730.2 |
| 2009/0014990 A1 | 1/2009 | Loibl et al. | |
| 2009/0230659 A1* | 9/2009 | Megiveron | B60R 21/0136 280/728.3 |
| 2011/0049852 A1 | 3/2011 | Kibat et al. | |
| 2012/0235388 A1 | 9/2012 | Suzuki | |
| 2013/0076014 A1 | 3/2013 | Thomas et al. | |
| 2015/0091278 A1* | 4/2015 | Yasuoka | B60R 21/2334 280/729 |
| 2015/0197209 A1* | 7/2015 | Fujiwara | B60R 21/231 280/730.1 |
| 2015/0266446 A1* | 9/2015 | Grindle | B60R 21/207 280/729 |
| 2016/0121839 A1* | 5/2016 | Ko | B60R 21/13 280/730.1 |
| 2016/0167616 A1* | 6/2016 | Wiik | B60R 21/207 280/729 |
| 2016/0347272 A1* | 12/2016 | Kato | B60R 21/207 |
| 2017/0136976 A1* | 5/2017 | Ohno | B60R 21/262 |
| 2017/0144622 A1* | 5/2017 | Perlo | B60R 21/23138 |
| 2017/0232922 A1* | 8/2017 | Wiik | B60R 21/23138 280/730.2 |
| 2019/0111883 A1* | 4/2019 | Thomas | B60R 21/231 |

FOREIGN PATENT DOCUMENTS

| | | | |
|---|---|---|---|
| DE | 10 2010 039 882 A1 | 3/2011 | |
| DE | 10 2012 203 411 A1 | 9/2012 | |
| DE | 10 2012 216 896 A1 | 3/2013 | |
| DE | 10 2005 002 085 B4 | 9/2013 | |
| DE | 10 2015 108 423 A1 | 9/2015 | |
| EP | 2 546 111 A1 | 1/2013 | |
| EP | 3 127 758 A1 | 2/2017 | |
| JP | 10315891 A * | 12/1998 | ....... B60R 21/23138 |
| WO | WO 2016/189145 A1 | 12/2016 | |

* cited by examiner

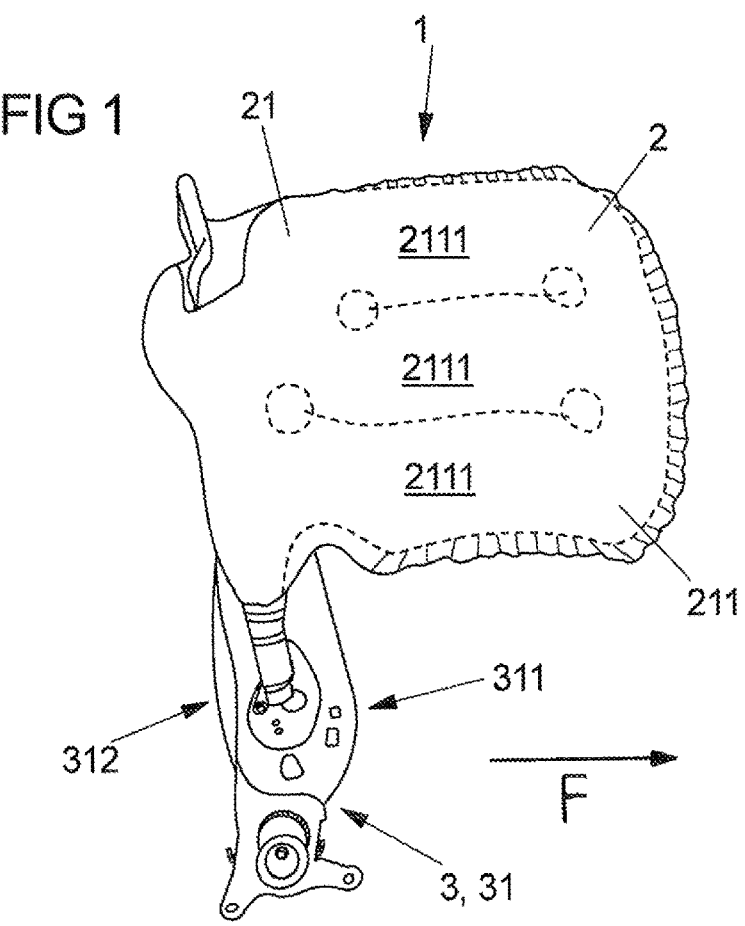
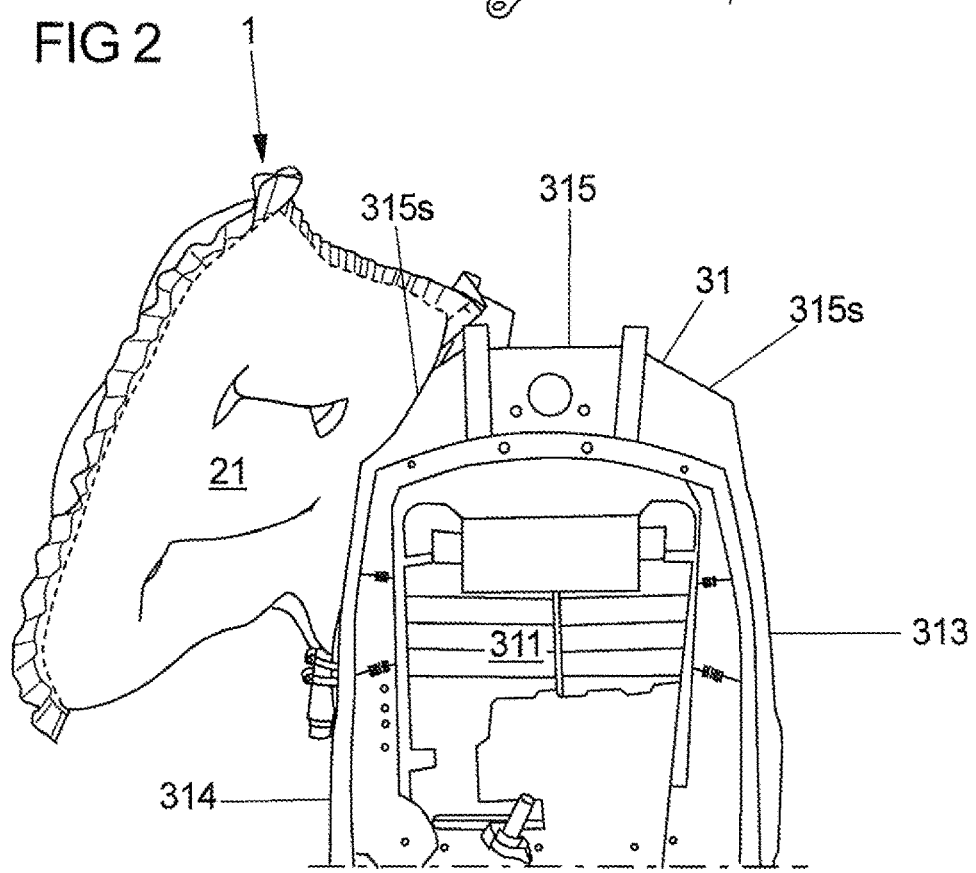

VEHICLE OCCUPANT RESTRAINT SYSTEM

REFERENCE TO RELATED APPLICATION

This application claims priority to German Patent Application No. 10 2017 125 755.1 filed on Nov. 3, 2017, the entirety of which is incorporated by reference herein.

BACKGROUND

This invention relates to a vehicle occupant restraint system.

Vehicle occupant restraint systems with an inflatable gas bag arranged on a vehicle seat serve to protect the passenger sitting on the vehicle seat in the case of an accident in which the passenger moves out of his normal seating position. In an accident the gas bag is filled with a gas and forms an air cushion. This air cushion can catch the passenger or his upper body and hence slow down the movement of the passenger.

Depending on the shape of the gas bag and the velocity of the passenger, the gas bag can break away in the case of an impact of the passenger on the gas bag and thus protect the passenger less efficiently.

SUMMARY

It is an object underlying the present invention to provide vehicle occupant restraint systems with a gas bag arranged on a vehicle seat, which in the case of an impact of the passenger breaks away as little as possible.

This object is solved by providing a vehicle occupant restraint system with features as described herein.

Accordingly, there is provided a vehicle occupant restraint system that comprises an airbag module and a vehicle seat, wherein the airbag module comprises an inflatable gas bag and the vehicle seat comprises a backrest with a front side, a rear side, a left side, a right sight and an upper side. The gas bag here is arranged at the backrest. The front side of the backrest here is understood to be the side against which a passenger can lean. The rear side is the side opposite the front side and is oriented substantially parallel to the same. When the vehicle seat is properly mounted in a vehicle, the front side and the rear side accordingly extend substantially perpendicularly to the direction of travel of the vehicle. The left side and the right side of the backrest form the narrow sides of the backrest, which extend between the front side and the rear side substantially vertically and perpendicularly to the front side and the rear side. The terms left and right are to be understood with respect to the direction of travel of the vehicle. In case the vehicle seat is a seat for the vehicle operator, the left side hence is the side facing the vehicle door and the right side is the side facing the vehicle interior space. The upper side of the backrest forms the narrow side of the backrest, which extends between the front side and the rear side and connects the front and rear sides at their upper ends.

The vehicle occupant restraint system is characterized in that the gas bag is arranged at the backrest of the vehicle seat such that in the inflated state the gas bag extends over a portion of the rear side of the back rest, over a portion of the left or the right side of the backrest and over a portion of the upper side of the backrest and is supported on the portion of the rear side of the backrest, on the portion of the left and the right side of the backrest, respectively, and on the portion of the upper side of the backrest. The inflated gas bag hence sectionally rests against these portions of the rear side, of the left and the right side, respectively, and of the upper side. The portion of the rear side in particular can be located in an edge region of the rear side, which on the one hand adjoins the left and the right side of the backrest, respectively, in particular the portion of the left and the right side of the backrest, and on the other hand adjoins the upper side of the backrest, in particular the portion of the upper side on which the gas bag is supported. Thus, one portion of the inflated gas bag (when the vehicle seat is properly mounted in a motor vehicle) extends substantially transversely to the direction of travel and one portion extends substantially along the direction of travel. Thus, the inflated gas bag can be supported on the backrest such that in a case of loading, i.e. when a passenger impacts on the inflated gas bag, it hardly breaks away.

In particular, the gas bag can include a gas bag chamber which in the inflated condition of the gas bag is filled with a gas, wherein the gas bag chamber sectionally extends over the portion of the rear side, over the portion of the left and right side, respectively, and over the portion of the upper side of the backrest and is supported on these portions. In the inflated condition (as seen from the rear side to the front side), a further portion of the gas bag chamber can extend beyond the front side so that this portion of the gas bag chamber can cushion an impacting upper body of a vehicle occupant. When the vehicle occupant restraint system is viewed from above along the front side, the rear side, the left side and the right side, the gas bag chamber substantially can have an L-shaped design.

According to one embodiment, the gas bag chamber in the inflated condition of the gas bag can include a plurality of substantially tubular portions that are arranged one beside the other as seen along a longitudinal axis of the tubular portions. The tubular portions can be substantially cylindrical, wherein the longitudinal axis of a tubular portion corresponds to the rotational axis of the cylinder. The rotational axes of the individual tubular portions can be arranged parallel to each other so that the tubular portions together form a planar portion of the gas bag in the inflated condition (of the gas bag chamber). The planar portion can be substantially flat or (slightly) curved. The curvature can be formed such that it appears concave to an occupant sitting on the vehicle seat. For example, three tubular portions can be arranged one beside the other. The tubular portions can be oriented along a direction that extends from the rear side to the front side of the backrest, and proceeding from the front side can protrude beyond the front side of the backrest. The tubular portions in particular can be provided in the region of the gas bag chamber that does not extend over the portion of the rear side of the backrest (and over the portion of the left and right side, respectively, and over the portion of the upper side). The region of the gas bag which in the inflated condition is supported on the backrest can comprise the tubular portions or portions of another shape.

The tubular portions each can have a substantially constant cross-sectional shape and size along their longitudinal axis. Due to the uniform shape, breaking away of the gas bag due to the impact of a vehicle occupant can be impeded additionally. For this purpose, the internal pressure of the inflated gas bag preferably can be 1-4 bar, in particular 2-3 bar.

For a particularly efficient protection of the vehicle occupant the gas bag is arranged in the shoulder region of the backrest. The shoulder region of the backrest is that region in which (as seen along the vertical extension of the backrest) the shoulders of the vehicle occupant sitting on the vehicle seat are properly arranged. Accordingly, the shoulder region is defined merely by its vertical extension. Thus, the front side, the rear side, the left side and the right side of the backrest each include a portion that is located in the shoulder region. Preferably, the gas bag is attached to the backrest in the shoulder region of the backrest.

According to one embodiment, the upper side of the backrest can have various shapes. The upper side in general can extend substantially horizontally. Thus, the portion of the upper side, on which the gas bag is supported in the inflated condition, also extends substantially horizontally. Alternatively, at its ends facing the left and the right side the upper side can extend linearly or curvedly from the portion of the left or the right side obliquely upwards to the opposite right or left side of the backrest. Thus, the portion of the upper side, on which the gas bag is supported in the inflated condition, correspondingly extends obliquely upwards in a linear or curved manner.

It is conceivable that the gas bag is connected to the (horizontal or linearly or curvedly oblique) portion of the upper side of the backrest. In particular, the gas bag can be connected to the portion of the upper side of the backrest close to the upper end of the gas bag chamber. Thus, it can be prevented that the upper end of the gas bag, which is properly located in the vicinity of the head of the vehicle occupant, can move freely. Alternatively or in addition, the gas bag can be connected to the left or right side of the backrest, which is located below the portion of the upper side of the backrest. In particular, the gas bag can be connected to the left or right side of the backrest close to the lower end of the gas bag chamber. Preferably, the gas bag is connected to at least two sides of the backrest.

In case the gas bag is connected both to the upper and to the left or right side of the backrest, the at least two-fold connection to a non-linear shape can cause a curvature of the inflated gas bag (of the gas bag chamber). The curvature is formed such that it appears concave to an occupant sitting on the vehicle seat. The curvature is also formed in the region of the gas bag chamber, which is not supported on the backrest. This curvature can additionally impede the breaking away of the gas bag due to an impact of an occupant. Furthermore, the gas bag can be connected to the rear side of the backrest. By this connection it can be ensured that the inflated gas bag extends over a portion of the rear side of the backrest and is supported on this portion.

The connection to the rear side can be provided as an alternative to the connection to the upper side. It can be provided that the gas bag is connected to the left or right side of the backrest and to the rear side of the backrest, wherein the connection to the rear side is not located at the same level as the connection to the left or right side. The connection to the rear side can be provided above or below the connection to the left or right side, as seen along the vertical extension of the backrest.

The connection to the rear side can also be provided as an alternative to the connection to the left or right side. It can be provided that the gas bag is connected to the upper side of the backrest and to the rear side of the backrest, wherein the connection to the rear side is not located at the same level as the connection to the upper side. The connection to the rear side can be provided below the connection to the upper side, as seen along the vertical extension of the backrest.

It is also conceivable that the gas bag is connected to three sides of the backrest, namely to the rear side, the upper side and the left or right side of the backrest. The relative positions of the connecting points here can be chosen corresponding to the combination of the various two-fold connections.

According to one embodiment, the gas bag has a gathering in a region of the gas bag that faces the portion of the rear side of the backrest and the portion of the upper side of the backrest. The gathering connects a portion of the gas bag resting against the backrest at the back and at the top, respectively. With this gathering it can be achieved that the gas bag in the inflated condition forms a curvature that appears concave to an occupant sitting on the vehicle seat. The gathering can be achieved by correspondingly sewing the portion of the left or right side to the portion of the upper side. Alternatively, a catch strap can be provided to form the gathering.

According to one embodiment, the left or right side of the backrest, on which the gas bag is supported in the inflated condition, is the side that faces a vehicle interior space and faces away from a vehicle door. Thus, in a side impact of the vehicle on the vehicle side facing away from the driver the inflated gas bag for example can hold the driver in the seat and protect the neighboring occupant against a collision.

The invention also relates to an airbag module that is suitable for the above-described vehicle occupant restraint system according to the invention. Accordingly, the airbag module includes an inflatable gas bag that is shaped such that the gas bag can be arranged on the backrest of the vehicle seat such that in the inflated condition the gas bag extends over a portion of a rear side of the back rest, over a portion of a left or a right side of the backrest and over a portion of an upper side of the backrest and is supported on the portion of the rear side of the backrest, on the portion of the left or the right side of the backrest, and on the portion of the upper side of the backrest. The airbag module furthermore can include all features of that airbag module which has been described as part of the vehicle occupant restraint system according to the invention.

BRIEF DESCRIPTION OF THE DRAWINGS

The invention will be explained in detail below by means of exemplary embodiments with reference to the Figures.

FIG. 1 shows a side view of the vehicle occupant restraint system according to an embodiment of the invention.

FIG. 2 shows a front view of the vehicle occupant restraint system of FIG. 1.

DETAILED DESCRIPTION

Figure 3:
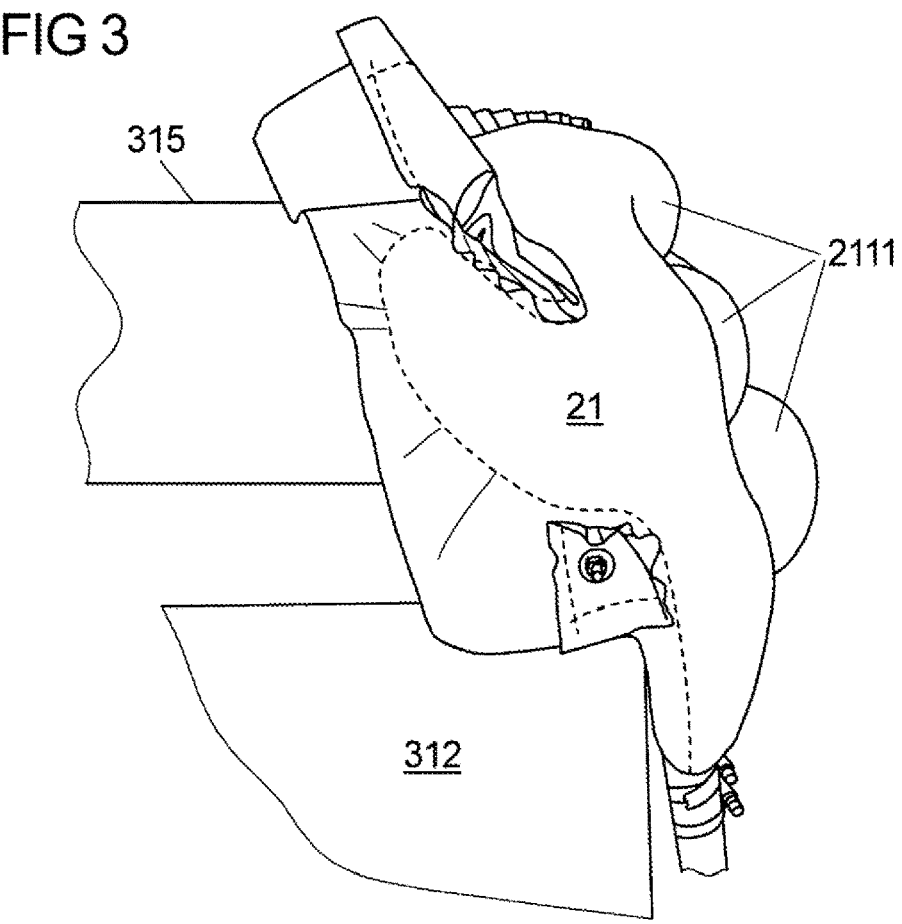
FIG. 3 shows a rear view of the vehicle occupant restraint system of FIG. 1.

FIGS. 1 to 4 show a vehicle occupant restraint system according to an embodiment of the invention from various perspectives. The vehicle occupant restraint system is designated with the reference numeral 1. The vehicle occupant restraint system 1 comprises an airbag module 2 and a vehicle seat 3.

The vehicle seat 3 comprises a backrest 31 that is provided to support the back of a vehicle occupant. In the properly arranged condition of the vehicle seat 3 in a vehicle, the backrest 31 extends substantially vertically and perpendicularly to the direction of travel, which in FIG. 1 is designated with the arrow F. The backrest 31 includes a front side 311, a rear side 312 opposite the front side 311, a left side 313 and a right side 314 as well as an upper side 315. The front side 311 is the side that is available for a vehicle occupant to lean on. In the condition of the vehicle seat 3 properly arranged in the vehicle the front and the rear side 311, 312 extend substantially perpendicularly to the direction of travel F. The left side 313 is disposed opposite the right side 314, wherein both sides 313, 314 extend vertically between the front side 311 and the rear side 312 and substantially perpendicularly to the same. The upper side 315 extends substantially horizontally between the front side 311 and the rear side 312 and substantially perpendicularly to the same, wherein the upper side here by way of example has an inclined portion 315s each at its ends facing the left and the right side 313, 314. Instead of the inclined portions, the upper side 315 can have a rounding each at its ends facing the left and the right side 313, 314 or simply extend horizontally.

The inclined portion 315s, which extends from the left side 313 (from the right side 314), is directed obliquely upwards in the direction of the right side 314 (left side 313). The inclined portion 315s each is arranged above the left and the right side 313, 314 and adjoins the same.

The airbag module 2 comprises an inflatable gas bag 21 and a gas generator (not shown), which in the case of activation provides a gas for filling the gas bag 21. In the inflated condition, the gas bag 21 encloses a gas bag chamber 211. By way of example, the gas bag chamber 211 here includes three tubular portions 2111 (less or more tubular portions 2111 also are conceivable), which substantially have a cylindrical shape. The tubular portions 2111 are arranged one beside the other such that the rotational axes of the cylinders extend substantially parallel to each other.

In the embodiment of FIGS. 1 to 4, the gas bag 21 by way of example is arranged on the right side 314 of the backrest 31. Alternatively, the gas bag 21 can be arranged on the left side 313 of the backrest 31. The gas bag 21 is arranged on the backrest 31 of the vehicle seat 3 such that in the inflated condition the gas bag 21 sectionally extends over a portion of the rear side 312 of the backrest (FIG. 3), over a portion of the right side 314 of the backrest (FIG. 1) and over an inclined portion 315s of the upper side 315 (FIG. 3) and is supported on the portion of the rear side 312 of the backrest 31, on the portion of the right side 314 of the backrest 31 and on the inclined portion 315s of the upper side 315 of the backrest 31. A further portion of the inflated gas bag 21 (of the gas bag chamber 211) is free and nowhere is supported. This free portion extends along the direction of travel F proceeding from the front side 311 of the backrest 31. The tubular portions 2111 primarily are formed in the free portion of the gas bag 21 and substantially extend along the direction of travel (i.e. along the direction that extends from the rear side 312 to the front side 311).

Figure 4:
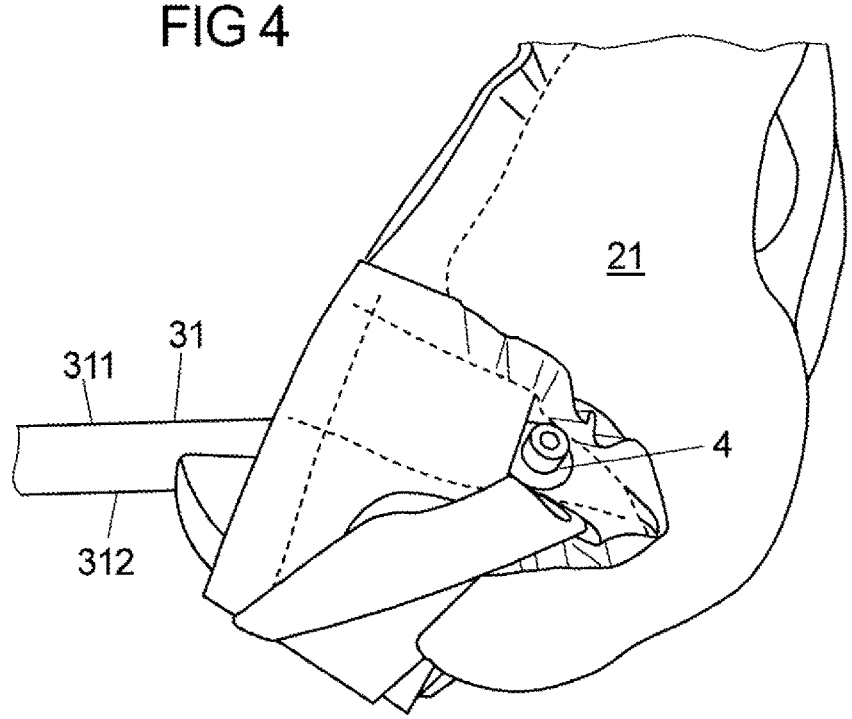
FIG. 4 shows a section of a top view of the vehicle occupant restraint system of FIG. 1.

As in the inflated condition the gas bag 21 (the gas bag chamber 211) extends over a portion of the rear side 312 of the backrest and over a portion of the right side 314 of the backrest, the gas bag substantially has an L-shape in the inflated condition as seen from above (FIG. 4).

Close to the upper end of the gas bag chamber 211 the gas bag 21 is attached to the inclined portion 315s of the upper side 315 and close to the lower end of the gas bag chamber 211 is attached to the right side 314 of the backrest 31. FIG. 2 reveals how the filled gas bag chamber 211 is curved due to this attachment of the gas bag 21 to the backrest 31. The shape of the curvature substantially is specified by the shape of the inclined portion 315s of the upper side 315 and by the shape of the right side 314 of the backrest 31. FIG. 4 by way of example shows a fastening means 4 that serves for fastening the gas bag 21 to the inclined portion 315s.

The invention claimed is:

1. A vehicle occupant restraint system comprising an airbag module and a vehicle seat, wherein the airbag module comprises an inflatable gas bag and the vehicle seat comprises a backrest with a front side, a rear side, a left side, a right side and an upper side, and wherein the gas bag is arranged at the backrest, wherein the gas bag is arranged at the backrest of the vehicle seat so that in the inflated state the gas bag extends over a portion of the rear side of the backrest, over a portion of the left or the right side of the backrest and over a portion of the upper side of the backrest and is supported on the portion of the rear side of the backrest, on the portion of the left or the right side of the backrest and on the portion of the upper side of the backrest.

2. The vehicle occupant restraint system according to claim 1, wherein the portion of the rear side directly adjoins the portion of the left or the right side and the portion of the upper side, and that the portion of the left or the right side directly adjoins the portion of the upper side.

3. The vehicle occupant restraint system according to claim 1, wherein the gas bag includes a gas bag chamber which in the inflated condition of the gas bag is filled with a gas, wherein the gas bag chamber sectionally extends over the portion of the rear side, over the portion of the left or the right side and over the portion of the upper side of the backrest and is supported on said portions.

4. The vehicle occupant restraint system according to claim 3, wherein in the inflated condition of the gas bag the gas bag chamber includes a plurality of substantially tubular portions that are arranged one beside the other as seen along a longitudinal axis of the tubular portions.

5. The vehicle occupant restraint system according to claim 4, wherein proceeding from the front side the tubular portions extend along a direction that is directed from the rear side to the front side of the backrest and protrude beyond the front side of the backrest.

6. The vehicle occupant restraint system according to claim 4, wherein along the longitudinal axis of the tubular portions the tubular portions each have a substantially constant cross-sectional shape and size.

7. The vehicle occupant restraint system according to claim 1, wherein the backrest has a shoulder region and the gas bag is attached to the backrest in the shoulder region of the backrest.

8. The vehicle occupant restraint system according to claim 1, wherein the portion of the upper side of the backrest extends substantially horizontally or linearly or curvedly from the portion of the left or the right side obliquely upwards in the direction of the opposite right or left side of the backrest.

9. The vehicle occupant restraint system according to claim 1, wherein the gas bag is connected to the left or right side of the backrest.

10. The vehicle occupant restraint system according to claim 1, wherein the gas bag is connected to the upper side of the backrest.

11. The vehicle occupant restraint system according to claim 1, wherein the gas bag is connected to the rear side of the backrest.

12. The vehicle occupant restraint system according to claim 1, wherein in a region of the gas bag which faces the portion of the rear side of the backrest and the portion of the upper side of the backrest the gas bag has a gathering.

13. The vehicle occupant restraint system according to claim 1, wherein the left or right side of the backrest is the side that faces a vehicle interior space and faces away from a vehicle door.

14. An airbag module for a vehicle occupant restraint system comprising an inflatable gas bag, wherein the gas bag is shaped such that the gas bag can be arranged at a backrest of a vehicle seat such that in the inflated state the gas bag extends over a portion of a rear side of the backrest, over a portion of a left or a right side of the backrest and over a portion of an upper side of the backrest and is supported on the portion of the rear side of the backrest, on the portion of the left or the right side of the backrest and on the portion of the upper side of the backrest.

\* \* \* \* \*